(12) United States Patent
Sato et al.

(10) Patent No.: US 7,712,775 B2
(45) Date of Patent: May 11, 2010

(54) ARRANGING STRUCTURE OF VEHICLE INTERIOR COMPONENTS

(75) Inventors: Takahiro Sato, Wako (JP); Hiroyuki Isayama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/135,443

(22) Filed: Jun. 9, 2008

(65) Prior Publication Data

US 2008/0303251 A1 Dec. 11, 2008

(30) Foreign Application Priority Data

Jun. 11, 2007 (JP) ............................ 2007-154018

(51) Int. Cl.
*B60R 21/20* (2006.01)
*B60R 21/213* (2006.01)

(52) U.S. Cl. .............. 280/730.2; 280/728.2; 280/728.3; 296/1.02

(58) Field of Classification Search .............. 280/728.2, 280/728.3, 730.2; 296/1.02
See application file for complete search history.

(56) References Cited

U.S. PATENT DOCUMENTS

| 5,791,683 | A * | 8/1998 | Shibata et al. ............ 280/730.2 |
| 6,254,123 | B1 * | 7/2001 | Urushi et al. ............. 280/730.2 |
| 6,293,581 | B1 * | 9/2001 | Saita et al. ................ 280/730.2 |
| 6,340,169 | B1 | 1/2002 | Tietze |
| 7,159,896 | B2 * | 1/2007 | Ochiai et al. ............. 280/730.2 |
| 7,175,196 | B2 * | 2/2007 | Boxey ...................... 280/730.2 |
| 7,331,598 | B2 * | 2/2008 | Inazu et al. ............... 280/728.2 |
| 2001/0006287 | A1 * | 7/2001 | Tanase et al. ............ 280/730.2 |
| 2001/0040361 | A1 * | 11/2001 | Tajima et al. ............ 280/728.2 |
| 2003/0006590 | A1 * | 1/2003 | Aoki et al. ............... 280/730.2 |
| 2004/0012173 | A1 * | 1/2004 | Blake et al. .............. 280/730.2 |
| 2005/0046154 | A1 * | 3/2005 | Rhea et al. ............... 280/728.2 |
| 2006/0082108 | A1 * | 4/2006 | Wahara et al. ........... 280/730.2 |
| 2007/0052220 | A1 * | 3/2007 | Hidaka .................... 280/730.2 |
| 2007/0176400 | A1 * | 8/2007 | Kamano ................... 280/730.2 |
| 2007/0210561 | A1 * | 9/2007 | Yamagiwa et al. ....... 280/730.2 |
| 2007/0241543 | A1 * | 10/2007 | Jang et al. ................ 280/730.2 |
| 2007/0296185 | A1 * | 12/2007 | Hidaka et al. ........... 280/728.2 |
| 2008/0197610 | A1 * | 8/2008 | Downey .................. 280/730.2 |
| 2009/0115169 | A1 * | 5/2009 | Chen et al. .............. 280/728.2 |

FOREIGN PATENT DOCUMENTS

| DE | 298 06 080 | 8/1998 |
| EP | 1 738 992 | 1/2007 |
| JP | 10-138859 | 5/1998 |
| WO | 2005/002932 | 1/2005 |

\* cited by examiner

*Primary Examiner*—Paul N Dickson
*Assistant Examiner*—James English
(74) *Attorney, Agent, or Firm*—Rankin, Hill & Clark LLP

(57) ABSTRACT

A structure of arranging interior components of a vehicle is provided. The structure includes a panel member extending along a side of a roof of the vehicle, and a bracket having a fixing base attached to the panel member, a first attaching base to which a first interior component is attached, and a bent piece connecting the fixing base and the first attaching base. The bent piece includes a sideward extending portion which inwardly extends in a width direction of the vehicle from the fixing base, and a downward extending portion which downwardly extends from the sideward extending portion and to which the first attaching base is connected. A second interior component is arranged between a space surrounded by the panel member and the bent piece.

8 Claims, 6 Drawing Sheets

ARRANGING STRUCTURE OF VEHICLE INTERIOR COMPONENTS

FIELD OF THE INVENTION

The present invention relates to an arranging structure of vehicle interior components in which a plurality of interior components, such as a curtain airbag and a grab rail, are arranged on a panel member of a side portion of a vehicle roof.

DESCRIPTION OF THE RELATED ART

In recent years, there has been developed a curtain airbag apparatus which, when a vehicle collides on a side surface thereof, deploys an airbag between an occupant and a side portion of a vehicle body in order to protect the occupant.

The airbag of the curtain airbag apparatus is folded and is attached to a vehicle interior side surface of a panel member disposed in a side portion of a vehicle roof. Normally, i.e., when the airbag is not deployed, a lower side of the airbag is covered by an end portion of a roof lining. The roof lining is a cover material on an interior side of the vehicle. When an impact is applied to the vehicle due to its collision or the like, a high-pressure gas is injected from an inflator into the airbag, whereby the airbag is downwardly deployed from the side portion of the vehicle roof to form a wall between the occupant and the side portion of the vehicle body for protection of the occupant.

On the side portion of the vehicle roof, some other interior components, such as a grab rail to be grabbed by the occupant, are attached on the interior side. Thus, in a vehicle equipped with the curtain airbag apparatus, the interior components such as the grab rail need to be arranged so as to avoid interfering with the airbag.

For example, JP 10-138859 A discloses an arranging structure of interior components, in which a bracket is attached to a vehicle interior side surface of a panel member disposed in a side portion of a vehicle roof The bracket extends inwardly in a vehicle width direction, and a grab rail (a first interior component) is attached to a component mounting base of the bracket. An airbag (a second interior component) is disposed on a lower side of the component mounting base, and is offset with respect to the component mounting base toward an outer side in the vehicle width direction.

However, in this related-art structure, because the grab rail is disposed on an upper side of a storage portion of the airbag and on an inner side of the storage portion of the airbag in the vehicle width direction, the mounting portion of the grab rail is likely to become a constraint on a design of various equipments on a roof portion of the vehicle.

SUMMARY OF THE INVENTION

It is an object of the present invention to provide an arranging structure of vehicle interior components in which first and second interior components are arranged on a panel member of a side portion of a vehicle roof without incurring the problem described above, thereby improving a design freedom of a roof portion of the vehicle.

According to one or more exemplary embodiment of the present invention, a structure of arranging interior components of a vehicle is provided. The structure includes a panel member extending along a side of a roof of the vehicle, and a bracket having a fixing base attached to the panel member, a first attaching base to which a first interior component is attached, and a bent piece connecting the fixing base and the first attaching base. The bent piece includes a sideward extending portion which inwardly extends in a width direction of the vehicle from the fixing base, and a downward extending portion which downwardly extends from the sideward extending portion and to which the first attaching base is connected. A second interior component is arranged between a space surrounded by the panel member and the bent piece.

According to one or more exemplary embodiment of the present invention, the structure further includes a guide portion provided on at least one of a lower edge of the bent piece and the first attaching base. The second interior component is a folded airbag, and the guide portion is configured to guide the airbag away from the first interior component when deploying the airbag.

According to one or more exemplary embodiment of the present invention, the structure further includes a roof lining. The first interior component is a grab rail adapted to be grabbed by an occupant inside the vehicle. The first attaching base is arranged to face away from the airbag, and the roof lining is fixedly held between the first attaching base and the grab rail.

According to one or more exemplary embodiment of the present invention, a section of the panel member and the bent piece form an inverted U shape such that the space is downwardly opened.

According to one or more exemplary embodiment of the present invention, the structure further includes a reinforcing rib upwardly protruding from an upper side edge of the first attaching base.

According to one or more exemplary embodiment of the present invention, the bracket has a second attaching base to which the second interior component is attached, and the first attaching base is disposed lower than the second attaching base.

According to one or more exemplary embodiment of the present invention, the structure further includes a holding cover inside which the second interior component is accommodated. The holding cover is attached to the second attaching base, and is downwardly opened.

According to one or more exemplary embodiment of the present invention, the bracket is formed in a one-piece structure.

DETAILED DESCRIPTION

Hereinafter, exemplary embodiments of the present invention will be explained with reference to the drawings. The following exemplary embodiments do not limit the scope of the invention. In the description, for convenience of explanation, respective directions are based on a condition that components are attached to a vehicle body.

Figure 1:
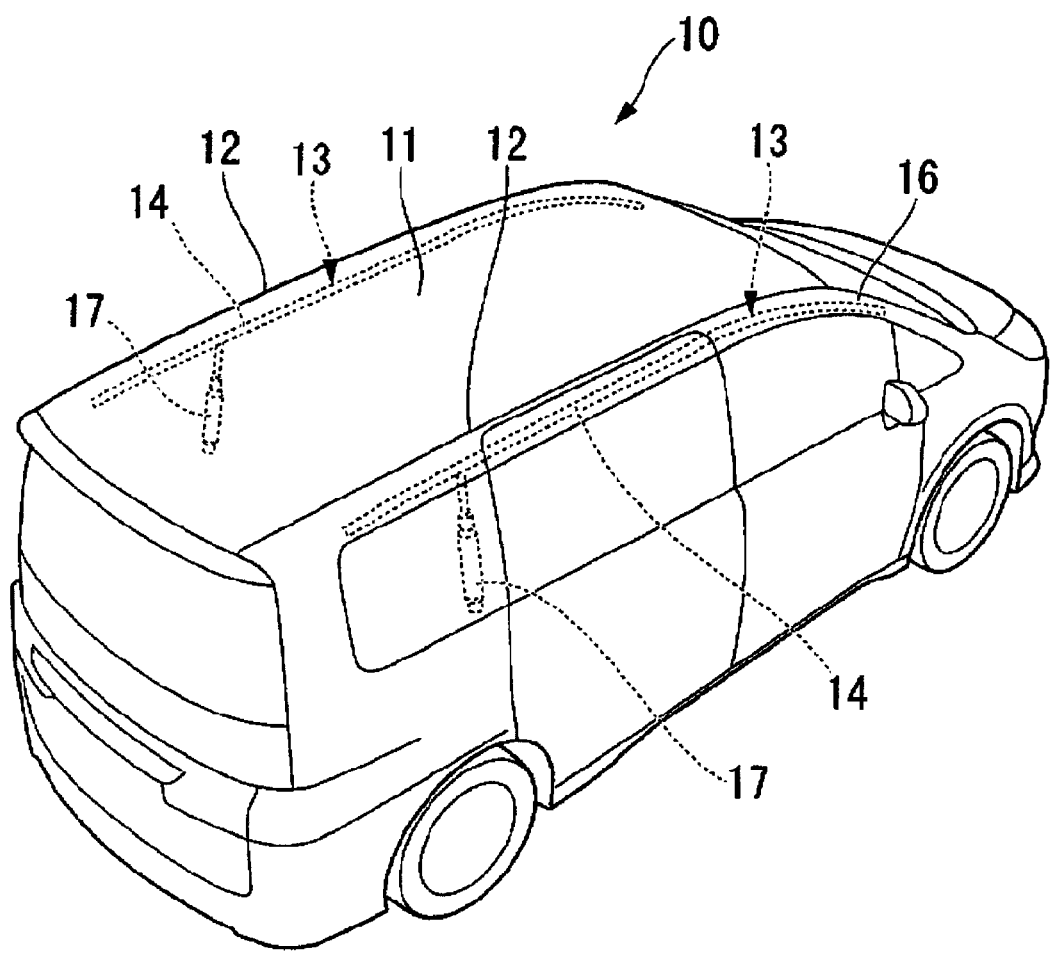
FIG. 1 is a perspective view of a vehicle according to an exemplary embodiment of the present invention.

FIG. 1 is a perspective view of a vehicle 10, when it is obliquely viewed from a right-rear side of the vehicle 10. As shown in FIG. 1, the vehicle 10 includes a roof 11 which is a part of a vehicle body, roof side rails 12 extending along a longitudinal direction of the vehicle 10 on respective sides of the roof 11, and curtain airbag apparatuses 13. An airbag 14 (a second interior component) of each of the curtain airbag apparatuses 13 is folded and is attached on a vehicle interior side of the corresponding one of the roof side rails 12.

Figure 2:
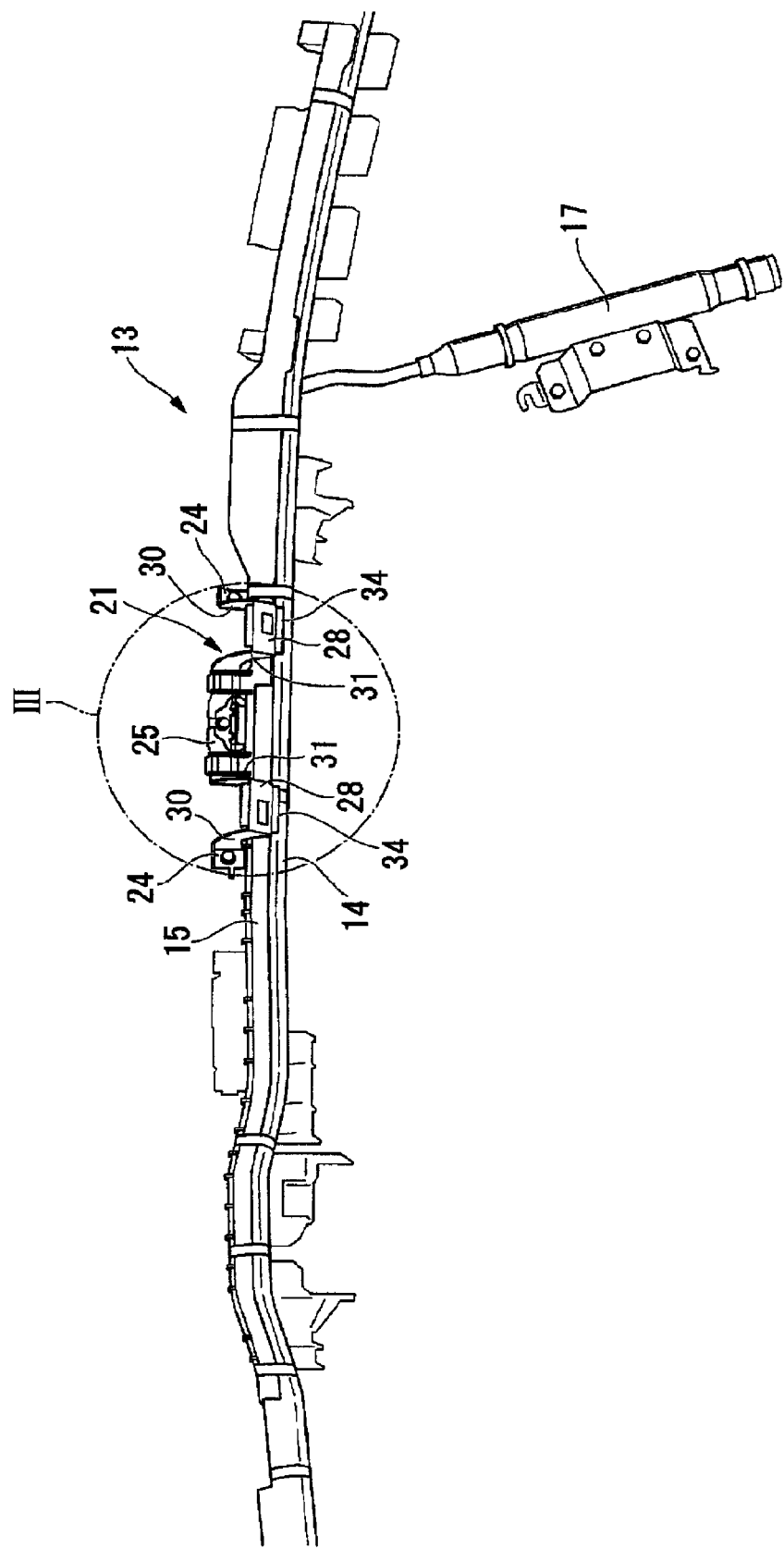
FIG. 2 is a front view seen from an interior side of the vehicle, showing how a curtain side-airbag apparatus is attached in an exemplary embodiment of the present invention.

FIG. 2 is a front view seen from the interior side of the vehicle 10, showing a portion near the roof side rail 12 on the right side in FIG. 1. In FIG. 2, for convenience of illustration, the roof side rail 12 and a cover member on the interior side of the vehicle 10 are not shown. As shown in FIG. 2, the airbag 14 of the curtain airbag apparatus 13 is folded and is accommodated in a resin-made holding cover 15 having an inverted U-shaped section. The holding cover 15 is attached, with its opening facing substantially downward, in a range from a front pillar 16 (see FIG. 1) along the roof side rail 12. An inflator 17 is coupled to the folded airbag 14. The inflator 17 generates a gas pressure when an impact is applied to the vehicle due to its side-collision or the like. When a high pressure gas is introduced from the inflator 17 into the airbag 14, the airbag 14 is deployed in the downward direction. The airbag 14 is deployable, on the vehicle interior side, like a curtain over a wide range from the front pillar 16 to the vicinity of a rear portion of the vehicle body, thereby protecting occupants inside the vehicle with a cushioning action by the gas pressure.

Figure 3:
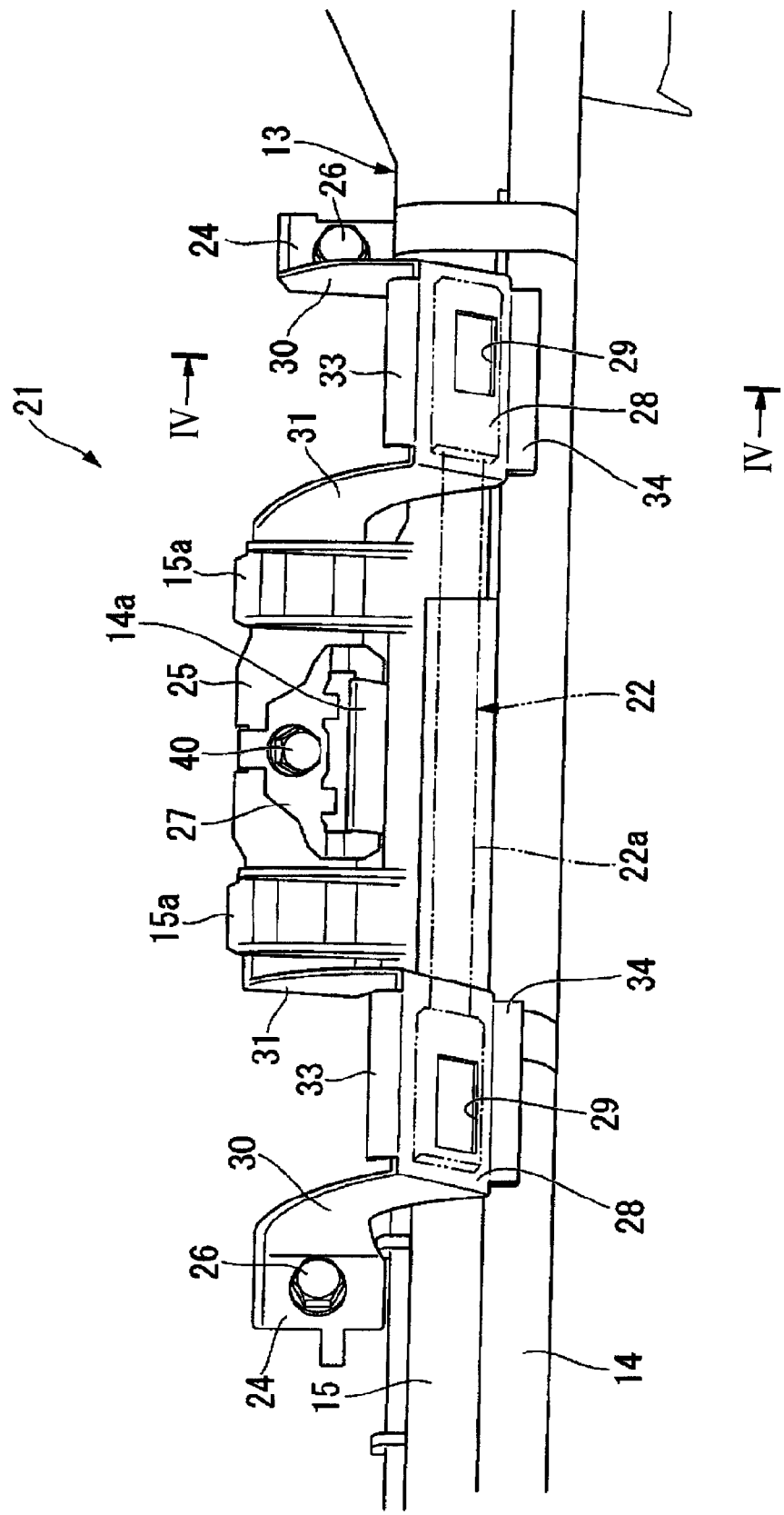
FIG. 3 is an enlarged front view of the portion III in FIG. 2.
Figure 4:
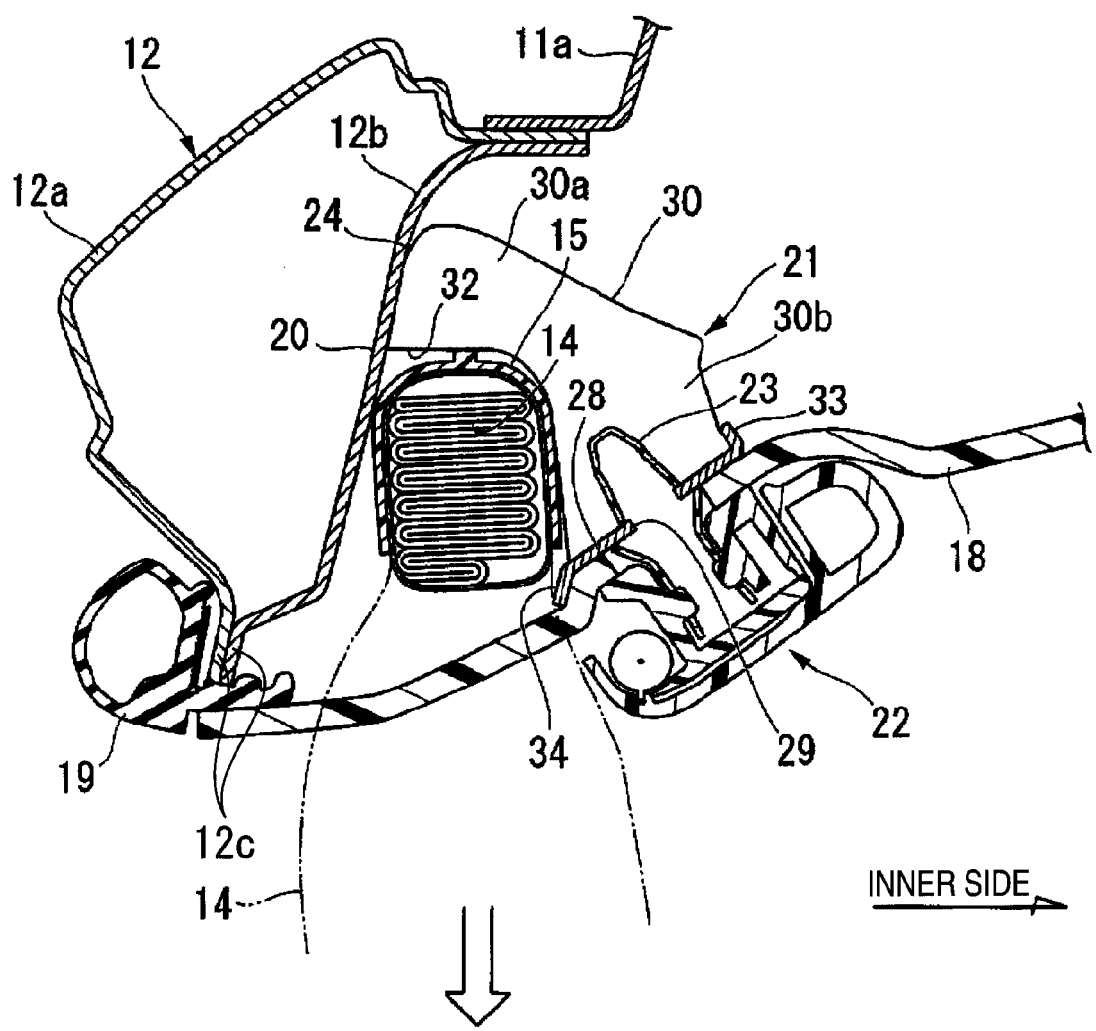
FIG. 4 is a sectional view taken along the line IV-IV in FIG. 3.

FIG. 3 is an enlarged view of the portion III in FIG. 2, and FIG. 4 is a sectional view taken along the line IV-IV in FIG. 3. In FIGS. 2 and 3, the roof side rail 12 the cover material on the vehicle interior side are omitted. However, as shown in FIG. 4, each of the roof side rails 12 includes an outer panel 12a on the outer side of the vehicle and an inner panel 12b (a panel member) on the inner side of the vehicle. The outer panel 12a and the inner panel 12b are joined to together to form a closed section structure. Further, a roof lining 18, i.e., a cover material, is attached on a ceiling portion of the vehicle interior. The side edge of the roof lining 18 in the vehicle width direction is extended to the vicinity of joining flanges 12c on lower ends of the outer panel 12a and inner panel 12b of the roof side rail 12, and is made in contact with a seal member 19 attached to the flanges 12c.

As shown in FIG. 4, the inner panel 12b of the roof side rail 12 includes a vertical wall 20 which is inwardly extended from the flange 12c on the lower end of the inner panel 12b and is then upwardly bent. An upper end portion of the vertical wall is bent inwardly in the vehicle width direction, and is joined to the outer panel 12a where the outer panel 12a is joined to a roof panel 11a.

A grab rail 22 (a second interior component) is attached on an inner surface of the vertical wall 20 of the inner panel 12b, facing a seat (not shown) inside the vehicle 10 interior, via a metallic bracket 21. The grab rail 22 is grabbed by an occupant seated on the seat for the purpose of keeping an occupant's posture and ensuring occupant's safety. The grab rail 22 includes a grab portion 22a (see FIG. 3) to be grabbed by the occupant, clips 23 (see FIG. 4) fixing the grab portion 22a to the bracket 21. The grab portion 22a may also be fixed to the bracket 21 with screws.

Figure 5:
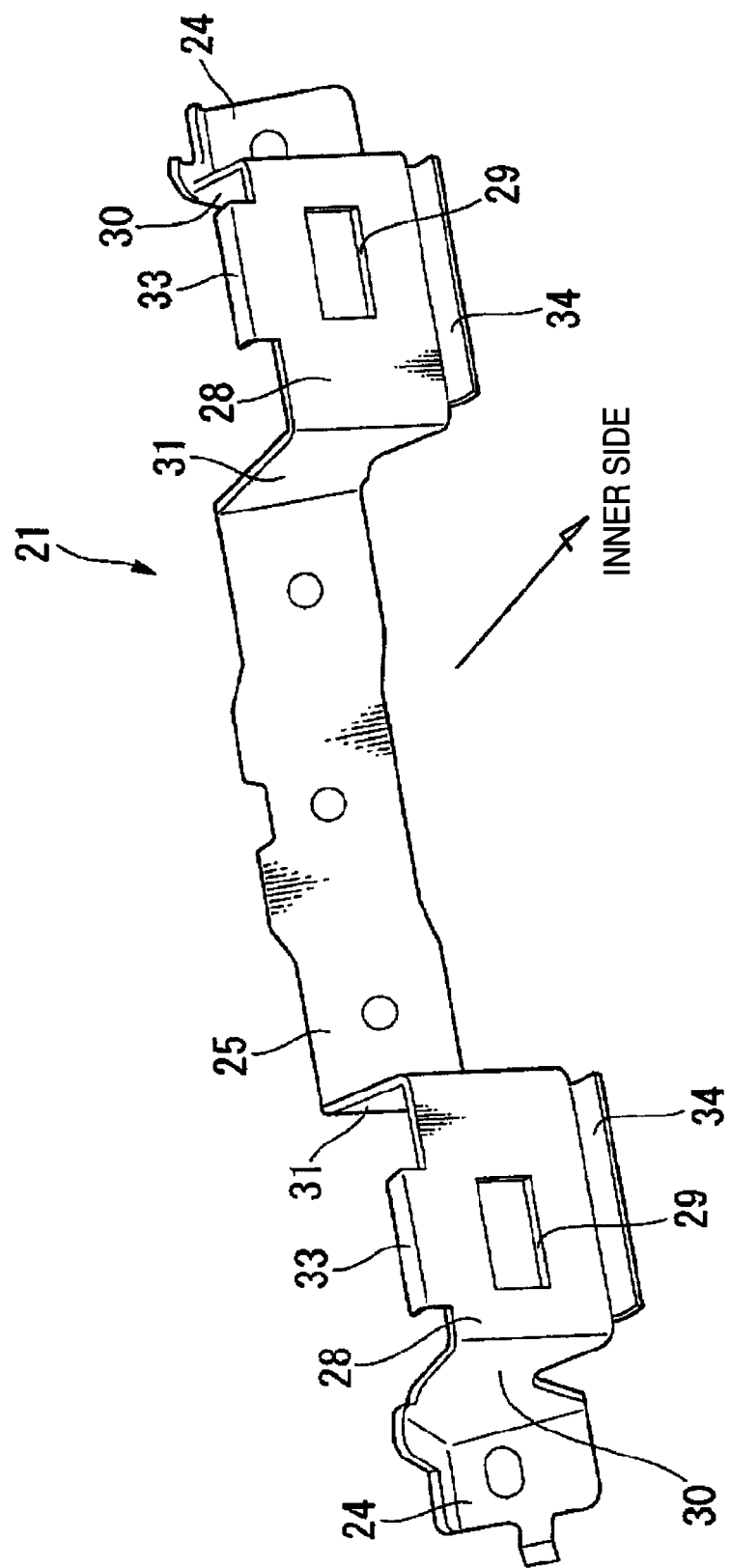
FIG. 5 is a perspective view of a bracket according to an exemplary embodiment.
Figure 6:
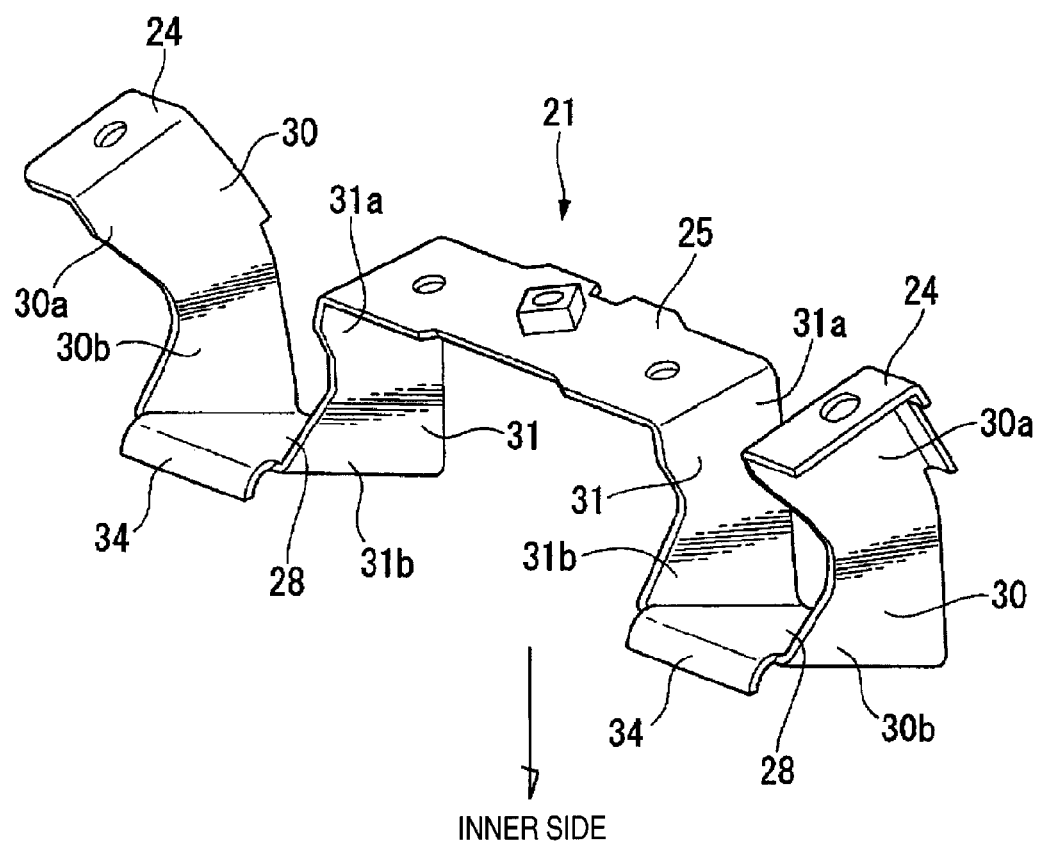
FIG. 6 is another perspective view of the bracket.

FIGS. 5 and 6 are perspective views of the bracket 21, each of the figures being viewed from different directions. As shown in these figures, the bracket 21 is formed by pressing a long metal plate, and is attached to the inner panel 12b of the roof side rail 12 such that a longitudinal direction of the bracket 21 extends along the longitudinal direction of the vehicle body. The bracket 21 includes fixing bases 24 on respective end portions in the longitudinal direction thereof, first attaching bases 28 disposed between the fixing bases 24, and a second attaching base 25 disposed substantially in the middle in the longitudinal direction of the bracket 21 between the first attaching cases 28. The fixing bases 24, the first attaching bases 28 and the second attaching base 25 are all substantially flat. As shown in FIG. 3, each of the fixing bases 24 is fixed to the inner panel 12b with a corresponding bolt 26. The second attaching base 25 is disposed slightly on an inner side than the fixing base 24 in the vehicle body width direction, and the airbag 14 and the holding cover 15 are attachable to the second attaching base 25. More specifically, as shown in FIG. 3, an upper end portion 14a of the belt-shaped airbag 14 is joined to a central portion of the second attaching base 25 with a holding member 27 and a bolt 40, and mounting pieces 15a of the holding cover 15 is engaged with portions of the second attaching base 25 on respective sides of the bolt connected portion.

Each of the first attaching bases 28 of the bracket 21 is interposed between the second attaching base 25 and the respective fixing bases 24, and is formed with a slot 29 extending in the longitudinal direction of the vehicle body. The end portions of the grab rail 22 are engaged with these slots 29 respectively.

Each of the first attaching bases 28 is connected to the second attaching base 25 and the adjacent fixing base 24 via bent pieces 30, 31. The bent pieces 30, 31 are respectively formed by bending the plate substantially at right angles with respect to the fixing bases 24 and the second attaching base 25 so as to extend in a plate thickness direction of the fixing bases 24 and the second attaching base 25. As shown in FIGS. 4 and 6, a surface of each of the bent pieces 30, 31, which is perpendicular to a plate thickness direction thereof, is formed substantially in an L shape. More specifically, each of the bent pieces 30, 31 includes a sideward extending portion 30a, 31a which inwardly extends in the vehicle width direction from the fixing bases 24 or the second attaching base 25, and a downward extending portion 30b, 31b which downwardly extends from a leading end portion of the sideward extending portion 30a, 31a. Each of the first attaching bases 28 is contiguously connected to end portions of the respective downward extending portions 30b, 31b such that the first attaching bases 28 downwardly face toward the inner side in the vehicle width direction. As shown in FIG. 4 (although only the bent piece 30 is shown in FIG. 4, the other bent piece 31 has a similar configuration as the bent piece 30), in a state in which the bracket 21 is attached to the vertical wall 20 of the inner panel 12b, the vertical wall 20 and each of the bent pieces 30, 31 form a space therebetween. This space has an inverted U-shape which is downwardly opened, and is used as a component accommodating portion 32 inside which the airbag 14 is accommodated together with the holding cover 15. As described above, each of the first attaching bases 28 faces obliquely downward, toward the inner side in the vehicle width direction. Thus, in other words, each of the first attaching bases 28 is disposed so as to face in a direction away from the attaching base portion of the airbag 14.

A reinforcing rib 33 is provided on an upper side edge of each of the first attaching bases 28, and a guide wall 34 (a guide portion) is provided on a lower side edge of the first attaching bases 28. The reinforcing rib 33 is formed by upwardly bending an upper edge portion of each of the first attaching bases 28 substantially at right angles, thereby improving rigidity of the first attaching bases 28 as well as the handling of the bracket 21. The guide wall 34 is formed by downwardly bending a lower edge portion of each of the first attaching bases 28 substantially in a vertical direction such that the guide wall 34 is positioned substantially right below a side wall of the holding cover 15 on the vehicle interior side, and such that the guide wall 34 and the side wall of the holding cover 15 is substantially on the same plane. The guide wall 34 serves as a guide portion which, when deploying the airbag 14, restricts the deployment of the airbag 14 in a certain direction.

As shown in FIG. 4, a side edge portion of the roof lining 18 in the vehicle width direction is placed along an inner side surface of each of the first attaching bases 28 of the bracket 21 and is fixed to the first attaching bases 28 together with the grab rail 22 such that the roof lining 18 is held between the first attaching bases 28 and the end portions of the grab rail 22. When deploying the airbag 14, a side edge of the roof lining 18 on an outer side of the first attaching bases 28 is pushed and is downwardly opened so as to allow the deployment of the airbag 14.

According to the configuration described above, when an impact is input to the vehicle 10 due to the side collision thereof, the airbag 14 is downwardly deployed by receiving a high pressure gas supplied from the inflator 17. Upon deploying the airbag 14, the airbag 14 downwardly pushes the side edge portion of the roof lining 18 while being restricted by the guide wall 34 of the bracket 21, whereby a thrust of the airbag 14 is prevented from being unnecessarily applied to the attaching portions of the roof lining 18 and the grab rail 22. Therefore, the roof lining 18 is prevented from being unnecessarily turned downward, and the grab rail 22 is prevented form being damaged.

According to the arranging structure of the interior components of the vehicle 10, the grab rail 22 is attached to the inner panel 12b of the roof side rail 12 via the bracket 21 having the substantially L-shaped bent pieces 30, 31, and the airbag 14 of the curtain airbag apparatus 13 is disposed inside the substantially inverted U-shaped component accommodating portion 32 surrounded by the inner panel 12b and the bent pieces 30, 31 of the bracket 21. That is, the grab rail 22 (the first interior component) and the airbag 14 (the second interior component) are arranged such that the grab rail 22 is not largely offset in the upward direction with respect to the airbag 14. Therefore, even in a case where a sufficient roof height cannot be obtained, the grab rail 22 and the airbag 14 can be arranged in a compact manner without narrowing the design freedom of the equipments, such as a sunroof, to be arranged in a portion of the roof 11. More specifically, according to the arranging structure of the interior components of the vehicle 10, the bent pieces 30, 31 of the bracket 21 straddle an upper portion of the airbag 14, and the bracket 21 is attached to the vertical wall 20 of the inner panel 12b. Thus, it is possible to prevent a center side space of the roof 11 from being reduced by the occupation of the bracket 21, and as a result, a sufficient space for providing an opening of the sunroof and a sunshade for opening and closing the sunroof opening or the like can be ensured in the portion of in the roof 11.

Further, the guide wall 34 is provided on the lower side edge of each of the first attaching bases 28 of the bracket 21 in order to prevent the airbag 14 from being deployed in the direction toward the attaching portion of the grab rail 22. Thus, when deploying the airbag 14, the airbag 14 is prevented from interfering with the grab rail 22, and the thrust of the airbag 14 is prevented from being excessively applied to the attaching portion of the grab rail 22, whereby the attaching portion of the grab rail 22 can be sufficiently protected. Especially, in the bracket 21 according to the exemplary embodiment, the guide wall 34 integrally formed by bending the lower edge portion of each of the first attaching bases 28. Therefore, it is advantageous in that a manufacturing cost is reduced because of the simplified structure, and in that the strength of the first attaching bases 28 is improved.

Further, the first attaching bases 28 of the bracket 21 are disposed such that they face inwardly downward in the vehicle width direction, i.e., in a direction away from the airbag 14, and the grab rail 22 and roof lining 18 are attached to the first attaching bases 28. This is advantageous in that the deploying thrust of the airbag 14 to be applied to the attaching portions of the grab rail 22 and roof lining 18 can be parried, thereby reducing further a load to be applied to the attaching portions.

In the foregoing exemplary embodiment, the guide wall 34 (the guide portion) is provided on the lower side edge of each of the first attaching bases 28 of the bracket 21 in order to restrict a certain developing direction of the airbag 14. However, in another exemplary embodiment, such a guide wall may also be provided on the downward extending portion 30b of each of the bent piece 30. Of course, the guide walls may be provided on both of the first attaching bases 28 and the bent pieces 30.

While description has been made in connection with exemplary embodiments of the present invention, those skilled in the art will understand that various changes and modification may be made therein without departing from the present invention. It is aimed, therefore, to cover in the appended claims all such changes and modifications falling within the true spirit and scope of the present invention.

What is claimed is:

1. A structure of arranging interior components of a vehicle, the structure comprising:
   a panel member extending along a side of a roof of the vehicle; and
   a bracket comprising a fixing base attached to the panel member, a first attaching base to which a first interior component is attached, the first attaching base facing obliquely downward toward an inner side in a width direction of the vehicle, and a bent piece connecting the fixing base and the first attaching base,
   wherein the bent piece comprises a sideward extending portion which inwardly extends in a width direction of the vehicle from the fixing base, and a downward extending portion which downwardly extends from the sideward extending portion and to which the first attaching base is connected, and
   a second interior component is arranged between a space surrounded by the panel member and the bent piece,
   wherein the bent piece straddles an upper portion of the second interior component.

2. The structure according to claim 1, further comprising a guide portion provided on at least one of a lower edge of the bent piece and the first attaching base,
   wherein the second interior component is a folded airbag, and
   the guide portion is configured to guide the airbag away from the first interior component when deploying the airbag.

3. The structure according to claim 2, further comprising a roof lining,
   wherein the first interior component is a grab rail adapted to be grabbed by an occupant inside the vehicle,
   the first attaching base is arranged to face away from the airbag, and
   the roof lining is fixedly held between the first attaching base and the grab rail.

4. The structure according to claim 1, wherein a section of the panel member and the bent piece form an inverted U shape such that the space is downwardly opened.

5. The structure according to claim 1, further comprising a reinforcing rib upwardly protruding from an upper side edge of the first attaching base.

6. The structure according to claim 1, wherein the bracket further comprises a second attaching base to which the second interior component is attached, and the first attaching base is disposed lower than the second attaching base.

7. The structure according to claim 6, further comprising a holding cover inside which the second interior component is accommodated, wherein the holding cover is attached to the second attaching base, and is downwardly opened.

8. The structure according to claim 1, wherein the bracket is formed in a one-piece structure.

* * * * *